United States Patent [19]

Ronai et al.

[11] 4,153,738
[45] May 8, 1979

[54] TEXTURED VEGETABLE PROTEIN FLAKES

[75] Inventors: Kenneth S. Ronai, Ridgewood; Henry C. Spanier, Ramsey; Felice Scaglione, Lodi; Edward F. Wisniewski, Roselle, all of N.J.

[73] Assignee: Nabisco, Inc., East Hanover, N.J.

[21] Appl. No.: 694,800

[22] Filed: Jun. 10, 1976

Related U.S. Application Data

[63] Continuation of Ser. No. 516,136, Oct. 18, 1974, Pat. No. 4,103,034.

[51] Int. Cl.² .............................. A23B 7/02; A23J 3/00
[52] U.S. Cl. ...................................... 426/656; 426/96; 426/457
[58] Field of Search ................ 426/96, 104, 416, 453, 426/454, 456, 457, 459, 468, 473, 506, 507, 508, 511, 512, 516, 516, 802, 807, 634, 656, 632

[56] References Cited

U.S. PATENT DOCUMENTS

| 2,904,435 | 9/1959 | Kruse | 426/457 X |
| 3,062,657 | 11/1962 | Vollink | 426/446 |
| 3,488,770 | 1/1970 | Atkinson | 426/802 X |
| 3,689,287 | 9/1972 | Mitchell, Jr. | 426/457 |
| 3,812,267 | 5/1974 | Atkinson | 426/802 X |
| 3,904,775 | 9/1975 | Harwood et al. | 426/802 X |
| 3,912,824 | 10/1975 | Spiel | 426/802 X |
| 3,914,455 | 10/1975 | Valentas et al. | 426/457 |
| 3,917,876 | 11/1975 | Harwood et al. | 426/656 X |

OTHER PUBLICATIONS

Technical Data Bulletin TDS 257376150, May 16, 1973, published by Staley Industrial Products, Decatur, Ill. 62525.

*Primary Examiner*—Robert Halper
*Attorney, Agent, or Firm*—Fisher, Christen & Sabol

[57] ABSTRACT

An instantly hydratable, light-colored soy protein material, having a protein content of 30% or more with improved blood blend flavor; blendable with fish or poultry and maintaining its structural integrity.

3 Claims, 1 Drawing Figure

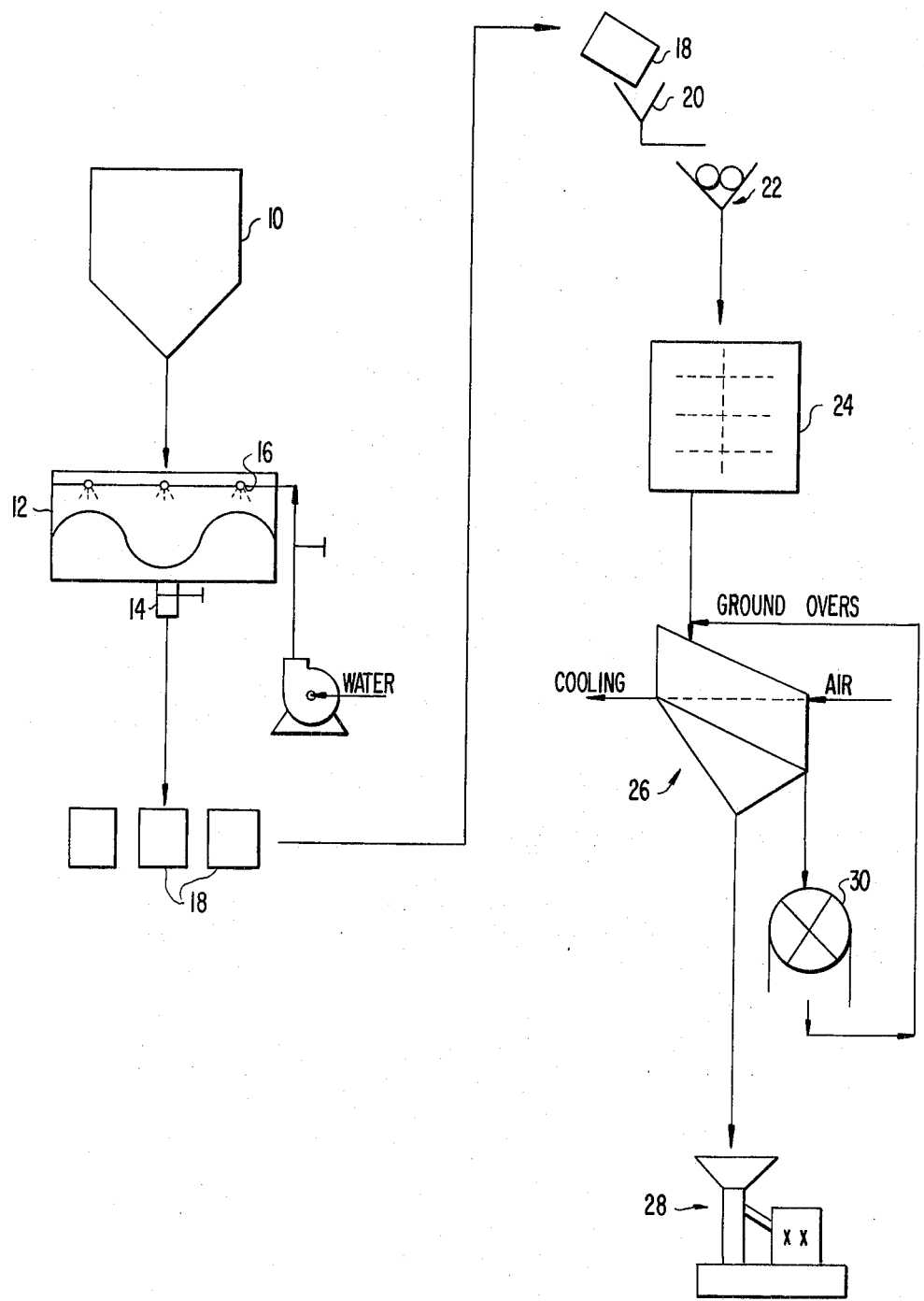

TEXTURED VEGETABLE PROTEIN FLAKES

This is a continuation of application Ser. No. 516,136, filed Oct. 18, 1974 now U.S. Pat. No. 4,103,034.

BACKGROUND OF THIS INVENTION

1. Field of This Invention

This invention related to novel edible, bland, textured, high vegetable protein flakes. This invention also relates to food containing such flakes, as an extender or base ingredient thereof.

2. Prior Art

World protein supplies derived from animal and fish sources, while seemingly extensive are actually quite limited as compared to the world human population. People in certain areas of the world suffer severely from protein deficiencies and a considerable amount of research has been directed to developing palatable, meat-like protein products from vegetable and plant sources. It is an object of this invention to help combat starvation and malnutrition and feed the hungry people of the world by providing a relatively simple, relatively inexpensive method for converting widely available non-meat proteinaceous materials such as soybeans, peanuts, sesame seeds, lentil beans, cotton seed, ground nuts, and, in general, nuts and beans of any type containing a high percentage of protein, preferably as high as thirty to forty percent into a palatable food product that is palatable (when cooked or uncooked) and simulates fish meat or the meat of fowl.

No prior art is known which teaches or suggests the flaking of hydrated compacted (textured) vegetable protein particles to produce flakes.

BROAD DESCRIPTION OF THIS INVENTION

This invention involves a method for preparing dried flaked textured high vegetable protein material which instantly hydrates and has an improved flavor. The process broadly involves texturizing a vegetable protein material by compacting it in a manner described in more detail below, fragmenting the compacted material, sizing the textured vegetable protein material, hydrating the textured vegetable protein material, flaking the textured vegetable protein material and drying the textured vegetable protein material.

The preferred process of this invention includes texturizing vegetable protein material by subjecting such vegetable protein material containing moisture to a pressure of at least 1,800 pounds per square inch for a time and at a temperature sufficient to convert said moisture into steam whereby such vegetable protein material is toasted without scorching and is compacted into a hard and substantially fused mass having textured characteristics. The fused mass is fragmented into particles. The textured vegetable protein material is sized so that the retained portion of the textured vegetable protein material has a particle size between one inch and 0.0469 inch. The retained (fraction) portion of the sized textured vegetable protein material is hydrated by adding enough water to raise the moisture content of the textured vegetable protein material to between 12 and 25 percent. The hydration is achieved at a temperature between 0° and 250° F. under a pressure between atmospheric and 15 p.s.i.q. for a period between 3 and 24 hours. The hydrated textured vegetable protein material is flaked in flaking rolls. The flaking rolls are adjusted to produce flakes having a thickness between 0.06 and 0.001 inch and a bulk density between 9 and 37 pounds per cubic foot. The flaking rolls have a roll surface temperature which is cold, ambient or hot. The flaked textured vegetable protein material is dried by reducing the moisture content of the flaked textured vegetable protein material to as low as 2 percent. The drying is done by heating the flaked textured vegetable protein material at a temperature between 90° and 500° F. for between 20 seconds and 24 hours. Preferably the drying is conducted at sufficient temperature for sufficient time to toast the flakes. The dried flaked textured vegetable protein material has a bulk density between 7 and 30 pounds per cubic foot.

The process of this invention allows the production of a textured vegetable protein in flake form whose thickness and size can be controlled.

This invention includes the textured vegetable protein flakes.

The textured vegetable protein flakes of this invention have certain advantages over prior textured vegetable protein products. One advantage is faster rehydration characteristics; the flakes of this invention instantly hydrate. When soy protein is involved, there is a less beany flavor. The removal of some of the more volatile components in soy helps to improve its flavor. The flakes of this invention are characterized by considerably less or no beany or nut-like flavor as compared to textured vegetable protein material prepared by prior art methods.

The flakes of this invention are easy to cook or otherwise prepare for consumption, such as, in ready to eat foods. The flakes of this invention are dry, storable, light-tan-colored, palatable and appetizing in appearance.

The flakes of this invention are bland, which means that they do not impart any unwanted taste to the final food product in which they are incorporated. The flakes of this invention, being textured, are chewable (but are not fibrous in taste or chew) and have a consistency and cohesiveness. The flakes of this invention are characterized by an improved texture without the need of texturizing agents such as edible oils (although such may be used for flavoring and/or nutritional purposes).

The flakes of this invention have a high absorption capacity for fats, oils and natural meat juices.

This invention presents a vastly improved flaked product via a novel process for concentrating the protein content of soybeans into a cohesive, textural flake unit.

The flakes of this invention can be used as extenders in foods, particularly in poultry, fish and meat compositions and in cereal and snack-type food compositions.

Being textured, the flakes of this invention provide a stable, lasting base to which color, flavor, nutrients and the like can be added. For example, the flakes of this base can be used as flavored chips.

This invention also includes the use of the flakes of this invention in food compositions and such food compositions themselves.

The flakes of this invention do not have to be, but can be fortified with vitamins and minerals according to governmental requirements which may now exist or come into being in the future.

DETAILED DESCRIPTION OF THIS INVENTION

In the accompanying drawing:

FIG. 1 is a flow diagram of the preferred process of this invention.

The drawings are explained in further detail as follows.

Textured soybean protein particles, which were texturized (compacted), particulated and sized to pass through a certain U.S. Standard Sieve Screen and not pass through a certain other U.S. Standard Sieve Screen, are placed in storage bin 10 which has a discharge feeder. The protein particles are charged to ribbon blender 12 which has central discharge 14 and is equipped with spray nozzle system 16. The protein particles are moistened and admixed. The moistened protein particles are placed in drums 18 (containers) and tempered for a period of time. Drums 18 are then emptied, as needed, into feed hopper 20. The protein particles are fed into flaking rolls 22 and then the protein particles are placed in drier 24. The dried flakes are cooled and sized in cooler-sizer 26. The desired fraction of flakes are bagged using bagging apparatus 28. The over-sized flakes are ground using grinder 30 and then are recycled to cooler-sizer 26.

This invention is eminently suited for the conversion of soybeans to texturized flakes and much of the description given hereinafter refers to soybeans. Nevertheless, in place of part or all of the soybean there can be substituted proteinaceous fish, animal and plant or vegetable materials containing high amounts of protein (e.g., up to thirty or forty percent or higher or lower). Suitable plant or vegetable materials include nuts, such as peanuts, beans, including lentil and mung beans, seeds such as rape seed, cotton seed, sesame seeds and the like, and substantially any type of legume, bean, nut or other plant or vegetable material (e.g., alfalfa or millet) having a high protein content or mixtures of same. Suitable high protein animal materials include casein and suitable fish protein material includes fish protein concentrate.

It is often desirable to use protein concentrates of some of the vegetable protein materials so as to assure a protein concentration of a specific level or protein by weight. The term "cohesive" denotes, among other things, that no binder is necessary. The term "bland" means that no objectionable tastes (e.g., soya taste) remain. The term "palatable" applies to the flakes themselves or use thereof (and also applies to situations where additives have been added to the flakes to make the flakes more palatable or more appetizing). The flakes are primarily used in food compositions which contain other ingredients including flavorings, spices and the like—the primary purpose being to produce a bland, non-distinctively tasting textured vegetable protein flake that does not have to have its taste disguised when used in food compositions.

The vegetable protein material can be, for example, one of the various defatted oil seed meals and flours. In fact, preferably the vegetable protein material is defatted before compaction.

The several varieties of soybeans, e.g., Lincoln soybeans, etc., are useful in this invention. Soybeans and other proteinaceous plant materials contain small amounts of enzymes, for example, urease and lipoxidase, and inhibitors, such as hemaglutin and antitrypsins. All are inactivated by the moist heat used in the processing steps herein. Also, the proteinaceous plant (soybean) material used herein usually contains such amino acids as arginine, histidine, lysine, tyrosine, tryptophane, phenylalanine, threonine, methionine, cystine, leucine, isoleucine, valine, glycine, and/or glutamic acid. The primary protein of soybean is glycinin, which is a mixture of short and long molecules made up in part of various amino acids. The soybean material also contains carbohydrates, ash, fibrous and pulpy constituents and associated flavoring ingredients.

The soybeans are usually processed to prepare soybean meal by the following sequence of steps, all of which are within the skill of those ordinarily skilled in the art; magnetic separation; bean cleaning; bean cracking (cracking rolls); dehulling; tempering; flaking; oil-extraction; and grinding. (Hulled or dehulled soybeans can be used in this invention. Also, defatted or full-fat soybean flour can be used as feed in this invention). The soybeans used as feed in the screw press or other compacting means are first conventionally particulated into meal, grits, flour, flakes or similar material, and the particulated material is conventionally processed using conventional solvent-extraction schemes to remove the oil. The most frequently used solvent is hexane, but examples of other volatile, nonpolar oil solvents which can be used are pentane, heptane and benzene. Also, mixed solvents can be used, such as volatile, nonpolar oil solvents, 1 to 10 percent water and volatile, polar organic solvents, such as acetone and the lower alcohols (like methanol, ethanol and propanol).

The particulated material is desolventized and/or deodorized by known techniques involving the application of heat, the degree of which affects the protein solubility range usually expressed in NSI or PDI, respectively, Nitrogen Solubility Index (AOCS Test Ba 10–65) and Protein Dispersability Index (AOCS Test Ba 10–65) which are standard tests of the American Oil Chemists Society. A suitable range of NSI for the particulated material used herein extends from 30 to 70, preferably 45 to 60. Too low an NSI or PDI provides a mass which is too loose for suitable compaction and too high an NSI results in a highly compacted chuck which is relatively difficult to hydrate.

Compacting is used to texturize the vegetable protein material. The compaction method is that of U.S. Pat. No. 731,737, the pertinent portions thereof being incorporated herein by reference, as modified by the following disclosure.

To effect compacting or texturizing, the particulated material (preferably flakes) which contains some moisture is then subjected to a pressure of at least 1,800 pounds per square inch for a time and at a temperature sufficient to convert moisture into steam. The material is toasted to a degree without scorching and compacted into a hard and substantially fused mass by mechanical means.

The pressure used is at least 1800 p.s.i., generally between 2000 and 5000 p.s.i. and preferably between 2000 and 3000 p.s.i. (The vast majority of the oil has been already removed from the soybean, so usually less than one percent by weight of oil remains in the soybean feed.) One reason why pressures between 2000 and 3000 pounds per square inch are preferred is that less energy is generated which results in less chance of scorching the product. Pressures below that specified result in chunks that are too loosely compacted, require extremely long times to achieve any degree of disembittering. Pressures in the above range result in a compacting and plasticizing of the material whereby a cake is formed. The plasticizing action during the pressure and heat treatment causes the cake to be substantially uniform. The cake is then fragmented into chunks which remain cohesive enough to stand being flaked and subjected to boiling water and then hot air.

The hydration properties of the pieces of compacted protein material of this invention can be controlled by controlling the compaction process. In general, the higher degree of compaction, the slower the rate of hydration. The reverse is also true. (Rehydration times of the dried flake product of this invention can be controlled to a degree by the same variable).

Insufficient compaction, e.g., at pressures below about 1800 p.s.i., or too low protein solubility produces pieces of compacted protein material that tend to form a mush or gruel upon hydration.

The moisture content of the material should be between 5 and 10 percent when it is fed into the equipment wherein it will be subjected to at least 1800 pounds per square inch. The reason for this is that that much moisture is neccessary to obtain partial or substantial disembittering by steaming in such equipment (i.e., the moisture is converted there into steam). If too much moisture is present, scorching of the product will occur or uneven toasting will result. If the moisture content of the soybean material is too high, the protein of the meal away from the source of the heat will not be toasted, or if sufficient heat and pressure are applied to toast the remote portions, those portions in juxtaposition to the source of heat will be scorched or burned.

The period of time of processing the soybean material at the stated pressure is normally between about 1.5 and 5 minutes to obtain the desired results. Preferably the time period is 3 minutes.

The soybean material can be treated by any conventional means which will produce the desired results. For example, a plate press having heated plates can be used.

The desired results are preferably obtained by the use of a modification of a screw press of the type disclosed in U.S. Pat. No. 731,737 (the pertinent portions of which are incorporated herein by reference) and customarily referred to in the art as an "Anderson expeller." The outer casing surrounding the screw does not contain the series of holes customarily used for removing oil from the soybean feed, because the oil has already been removed from the particulate soybean feed used in this invention. The modified Anderson expeller includes a preconditioning chamber which is, for example a 14 inch wide by 14 feet long steam-jacketed continuous ribbon blender. Next in the process line is a vertical force feeder which conveys the particulate soybean material to the main horizontal pressing chamber. The main horizontal pressing chamber has been modified by replacing the barrel spacing bars with solid polished plates. Also the main press worm (screw) has been modified by sliding a tapered cone along the shaft into the pressed cake outlet space to increase the internal pressure along the press worm and to obtain uniform, thin, compacted material (usually about ⅜ inch thick). All internal surfaces of the press subjected to contact with the soy material or compacted material are hardened and highly polished for smooth flow of the material through the press.

The press is normally set so that the thickness of the resulting cake (mass) is ¼ to ⅜ inch, but this thickness is not critical and is only a preferred condition.

The screw press can be modified by the addition of heating coils around the outer wall of the screw press casing housing the rotable screw so as to uniformly heat the casing in such regions. This is normally not done when the soybean particles have been preheated in a preconditioning chamber. (Any other heating arrangement can be used).

The desired temperature of the soybean material during the pressing is 150° to 200° C. (about 302° to about 392° F.) so the inner casing wall should not have a temperature which will cause the temperature of the soybean material to rise above 200° C. or else the soybean material may become scorched. The pressures in the press will convert the moisture into steam, but not all of the energy produced will be used in vaporizing the moisture—some will go to generally raising the temperature of the soybean material. If properly done within the limits set forth herein the resulting cake (mass) will not be scorched. Some degree of disembittering is obtained by the steam thusly produced, but the cake (mass) still has a degree of bitterness or beany flavor and has a nutty flavor. Many of the important characteristics of the flake product have not been obtained at this point in the processing of the soybeans.

As previously stated, the temperature of the soybean material should be between 150° and 200° c., and preferably 165° to 180° C. This assures partial or substantial disembitterment without scorching. The soybean material can be preheated, before being fed into the pressure-treated equipment, to a temperature between 160° and 200° F. Soybean material which contains too high of a moisture content can be preheated and dried to the proper moisture content in a tempering chamber before being fed into the pressure equipment. When equipment like a press plate having heated plates is used, the soybean material is first placed therebetween and allowed to stand in order to preheat the material.

The mass obtained from the screw press or other equivalent processing equipment is fragmented by any convenient means. Examples of such means are chopping blades, grinders and crushers.

The vegetable protein material is texturized in a compaction process to establish a basic textural unit. Texturization takes place when the protein acquires a substantially continuous phase; compacting is the process of changing discrete particles of protein into continuous phase protein.

The texturized vegetable protein material, after compacting, is particulated by any suitable means. The particulating is preferably achieved by chopping followed by grinding (e.g., using a ball mill, ring roller mill, disk mill or fluid energy mill). Other useful means of particulation include crushing (e.g., using jaw crushers, cone crushers, pan crushers, rotary crushers or the like), cutting, machining, etc.

The texturized vegetable protein material is then sized to the proper particle size or range. The preferred method of sizing is the use of vibrating screens. Other useful methods of sizing involve the use of grizzlies, shaking screens or oscillating screens. The protein material is sized to between one inch and 0.0469 inch. (No. 16 mesh U.S. Standard Sieve Screen) and preferably between 0.157 inch (No. 5 U.S. Standard Seive Screen) and 0.0469 inch.

The sized texturized vegetable protein material is hydrated to the proper moisture. Flavors and colorants can be added to the protein material, if desired, during the hydration step.

The sized texturized vegetable protein material is hydrated at a pressure between atmospheric pressure and 15 p.s.i. (preferably between 65° and 75° F.) for a period of time between 3 and 24 hours (preferably between 12 and 18 hours). Sufficient water is introduced into the protein material to give it a moisture content between 12 and 25 percent by weight (preferably between 14 and 18 percent by weight). For example, 200 grams of compacted textured vegetable protein sized through a U.S. Standard Sieve No. 5 and retained on a U.S. Standard Sieve No. 16 and having a moisture content of 6 percent by weight and 22 grams of cold tap water yields a hydrated protein material having a moisture content of 15 percent by weight. Colorants and flavoring agents can be added during the hydration step.

The hydration can be achieved using any suitable means. Preferably the hydration is achieved by (throughly) admixing sufficient water with the protein material. The moistening time, which includes any charge and discharge time, is about one hour. Then, the moistened protein material is tempered to achieve thorough hydration. The tempering is preferably done by placing the moistened protein material in a suitable bin or container and allowing it to temper for 7 to 14 hours. The steps involving water apparently remove some water soluble components which are responsible for some of the undesirable bitter and beany taste and the odor and apparently have a role in determining the texture of the dry flake product.

The hydration (and rehydration) properties can be controlled by controlling the degree of compaction. In general, the higher the degree of compaction, the slower the rate of hydration (and rehydration)—the reverse is also true.

The pH range of the hydration water is quite wide, usually between 5 and 10, preferably between 6 and 7 and most preferably, as close to neutral as possible.

Flaking is effected by means of flaking rolls or other suitable means. The preferred flaking rolls are described in Example 2.

The surface temperature of each flaking roll can range from cold to hot (e.g. 35° to 200° F.), but is preferably at ambient or room temperature.

The flakes resulting from the flaking step generally have a bulk density between 9 and 37 pounds per cubic foot, and preferably 21 pounds per cubic foot. The bulk density of the flake is primarily controlled by the flaking rolls, but is secondarily controlled by the prior degree of compaction.

The thickness of the flakes of this invention should range from 0.06 to 0.001 inch—the former being termed "bumped" and the latter being termed "ultra thin." Preferably the thickness of the flakes of this invention is between 0.010 and 0.012 inch. The use of flaking rolls achieves the desired thickness.

The size of the flakes (not to be confused with thickness of the flakes) is determined (i) by the size of the particles before flaking, which is determined by a sizing step before the hydration step, and (ii) the thickness of the flakes achieved by passage of the hydrated particles through the flaking rolls (gap between rolls, etc.).

The amount of compaction controls the hardness of the particle and the rate of hydration. The degree of hydration controls the flaking process.

The flaked textured vegetable protein can be dried and toasted by any suitable method. Preferably the drying and toasting is achieved by means of a stream of hot dry air. The drying is preferably achieved using dry air having a temperature between 150° and 250° F., usually 200° F. The dry air should have a low relative humidity, e.g., 30 percent, for an efficient drying operation. The preferred drying and toasting equipment is described in Example 2. (The flakes can be dried using a Shouldice oven, but it is impractical to process the small size flakes in such an oven due to the product losses through the drum perforations of the oven and through the discharge system). A continuous drying scheme can be used. Also, for example, vacuum drying or freeze drying can be used.

The moisture of the flaked textured vegetable protein ranges from 12 to 25 percent by weight. The moisture content of the flakes is reduced to between 10 and 2 percent by weight and preferably to 5 percent by weight, during the drying step. (The preferred moisture content of the flaked textured vegetable protein is between about 14 and about 18 percent by weight, which is preferably reduced by drying to about 5 percent by weight).

The flaked textured vegetable protein material is dried and toasted at a temperature between 90° and 500° F., and preferably between 180° and 200° F. Little or no toasting occurs when the lower temperatures are used, so such temperatures (or higher temperatures for very short periods of time) are used when little or no toasting of the flakes is desired.

The drying and toasting is conducted for a period of time between 20 seconds and 24 hours, and preferably between 1.5 and 2.5 hours.

Care should be taken so that the flaked textured vegetable protein material is not scorched or unevenly toasted during the drying and toasting step.

The bulk density of the dried flaked textured vegetable protein material is generally between 7 and 38 pound per cubic foot and is preferably between 17 and 21 pounds per cubic foot.

The dried flakes can be sized (e.g., by sieving) to a specific size or size range for use in specific products or food compositions. Also, the dried flakes can be used without any sizing.

The dried flakes can be used, for example, as an ingredient in the following food compositions: tuna salad (inclusive of salmon and other fish varieties as well as egg and chicken) as a helper or extender; instant hot breakfast cereals (inclusive of flavored varieties and/or plain oatmeal) as part of the base; onion flavored dehydrated bits and pieces (inclusive of other vegetable flavors, such as, mushrooms, green bell pepper, celery, tomato, etc.); ground meat as an extender; scrambled eggs, as an extender (inclusive of omelets); flavored bits and pieces—(1) meat, bacon, pepperoni, sausage, etc., (2) fruit, e.g., apple, berry, etc., and (3) nut, e.g., peanut, pecan, walnut, etc.; codfish cakes (inclusive of fish sticks); chicken croquettes (inclusive of turkey); snack flakes (deep fat fried and onion salted); cold cereal—(1) granola additive and (2) high protein or additive for corn or wheat flakes.

The dried flakes of this invention can be used in an endless variety of ways to furnish vegetable protein as a meat protein substitute. The dried flakes can be rehydrated and eaten cold or hot (preferred). The dried flakes can be mixed with other food ingredients, flavor enhancers and other edible ingredients, including water for rehydration purposes, and eaten, cold or hot (preferred). The dried flakes of this invention can be mixed with some or all of the above-described ingredients, but not including rehydration water, and eaten cold or hot (preferred).

The dried flakes of this invention can be used to produce products which simulate fish, poultry (including turkey and chicken) beef, veal, liver, mutton and ham, as dehydrated, hydrated, canned or frozen materials. The dehydrated (dried) flakes are usually supplied in multiwall bags or fiber drums and hydrated flake food products are usually supplied in cans or frozen packages. As a general guideline, the dry flakes or flake containing product requires rehydration by the customer and additional processing for finished products by commercial facilities. The rehydrated flake food product in a frozen form is ready to use upon thawing and is especially recommended for institutional use. The rehydrated flake food product in a canned form is ready to use and is recommended for institutions with limited kitchen facilities. Rehydration can readily be done by the consumer, or the step can be achieved before the consumer receives the end product. The rehydration is normally done during admixing of the food composition. The following illustrates the variety of ways in which the flakes of this invention can be used. The dry and rehydrated flakes of this invention can be fried, grilled, baked or retorted and still retain their textural integrity. They can readily be mixed with ground meat, rice, corn meal or almost any other protein enrichment. They can be precooked and dried, frozen or canned as a ready-to-use product.

A very important feature of this invention is that the flakes can withstand the usual retorting conditions for canned products (i.e., 250° F. 30 mins. to one hour).

Flavoring systems including flavor enhancers and/or agents can be added to the food compositions of this invention, but are usually not needed. Usually the flavor enhancers are added in the amount of 0.1 to 2 percent by weight. Examples of flavor enhancers are monosodium glutamate, disodium inosinate and disodium guanylate. Flavoring agents in the usual amount of 10 to 20 percent by weight can be added.

The meat-like texture (fish or poultry) of the flakes in the food composition is aided by the fact that they are not (but can be) coated or impregnated by an edible oleaginous material after the drying step.

The flakes of the invention can be rehydrated for consumption or can be used as a raw material that is, for example, oiled and flavored and treated according to the method described in U.S. Pat. No. 3,485,636.

Some of the food compositions of this invention are cooked or heated after formulation, which generally presents no problem. (Many of the food compositions are ready-to-eat). Long term cooking might eventually destroy the quality of the food compositions.

Compacting using a modified "Anderson expeller" plasticizes the protein. This invention generally utilizes thermoplastic compaction to obtain its laminated basic structure.

When used in fish and poultry meat compositions, the flakes of this invention have a "meat-like" consistency which is quite similar to that of fish and/or poultry, which have a flaked rather than a chunky texture. Chunks are not as compatible as flakes for this reason with fish and/or poultry.

Unless otherwise stated or indicated in the following examples and throughout the rest of the specification and in the claims, all percentages parts and portions are expressed on a weight basis, based upon total compositions. The following examples further illustrate but do not limit this invention.

EXAMPLE 1

The starting material comprised flakes of dehulled, solvent-extracted soybean having a moisture content of about 7.5 percent and an N.S.I. of about 50.4. The soybean flakes were processed in a "modified Anderson expeller" as described above.

The soybean flakes were preheated to about 180° F. in the preconditioning chamber. The retention time in the preconditioning chamber was 1 minute, and steam having a pressure of 65 p.s.i.g. was used in the steam jacket. The soybean flakes had a moisture content of 6.8 percent upon exiting from the preconditioning chamber and were passed through a vertical force feeder into the main horizontal pressing chamber. The processing retention time (time during which the pressure is applied) was 2 minutes; the pressure applied was 2000 p.s.i.; and the thickness of the cake was about ⅜ inch. The cake during the pressing had a temperature of 305° F. The exiting cake had a moisture content of 5.5 percent, was allowed to cool and was fragmented by means of chopping blades into chunks and then ground into smaller particles. The particles had a light yellowish brown or buff color and were not porous in appearance.

The compacted particles had an analysis (weight percent on a dry basis) as follows:

| Component | Percent |
|---|---|
| Protein (N×6.25) | 53.5 |
| Fat | 1.2 |
| Fiber | 4.0 |
| Ash | 6.7 |
| Carbohydrate (difference) | 34.6 |

The noted calculation basis for the protein was N×6.25, wherein N is the value obtained by an analysis for protein nitrogen using the Kjeldahl Test and 6.25 is the standard factor for soy to get total protein.

The following is the amino acid profile of the compacted soybean particles:

| Amino Acid | Percent |
|---|---|
| Lysine | 4.798 |
| Available Lysine | 4.421 |
| Histidine | 2.016 |
| Arginine | 5.664 |
| Aspartic Acid | 9.142 |
| Threonine | 2.882 |
| Serine | 3.977 |
| Glutamic Acid | 14.230 |
| Proline | 3.996 |
| Glycine | 3.293 |
| Alanine | 3.546 |
| Cystine, Half | Trace |
| Valine | 3.038 |
| Methionine | 1.281 |
| Isoleucine | 2.732 |
| Leucine | 4.858 |
| Tyrosine | 2.455 |
| Phenylalanine | 3.614 |

The following is the vitamin analysis for the compacted soybean particles:

| Vitamins | Amounts |
|---|---|
| Thiamin | 3.49 mgs per lb. |
| Riboflavin | 2.18 mgs per lb. |
| Niacin | 8.17 mgs per lb. |
| Vitamin $B_6$ | 2.27 mgs per lb. |
| Vitamin $B_{12}$ | None detected |

The protein Efficiency Ratio of the compacted particles was 87 percent of that for casein.

The following is the mineral analysis for the compacted soybeans particles:

| Mineral | Amount |
| --- | --- |
| Calcium | 0.216 percent |
| Phosphorous | 0.660 percent |
| Potassium | 0.230 percent |
| Magnesium | 0.280 percent |
| Iron | 90.5 ppm |
| Copper | 15.0 ppm |
| Manganese | 20.0 ppm |
| Zinc | 81.0 ppm |
| Sodium Chloride | 0.222 percent |
| Cobalt | 0.033 ppm |
| Iodine | Less than 0.14 ppm |

EXAMPLE 2

A sufficient amount of the textured soybean chunks produced in Example 1 were sized by sieving to obtain 10,000 pounds of textured soybean chunks which passed through a No. 5 U.S. Standard Sieve Screen and which did not pass through a No. 16 U.S. Standard Sieve Screen. The 10,000 pounds of textured soybean chunks, termed "chunks-516" were stored in a storage bin having a discharge feeder.

1200 pounds of chunks-516 were charged into a Sprout Waldron ribbon blender having a center discharge, equipped with a 40 h.p. motor, equipped with a spray nozzle system and having a maximum capacity of 1200 pounds of chunks-516. The blender agitator was turned on, and 120 pounds of warm water (100° to 130° F.) was added slowly during agitation. The speed of the helix of the blender was about 40 R.P.M. The batch was blended for an additional 5 minutes after the water was added. The total batch moistening time, including charging and discharging of the material, was approximately one hour. This sequence of blending and addition of water insured uniform and well distributed moisture throughout the batch.

The moistened textured soybean chunks-516 in the ribbon blender were transferred to 55 gallon metal drums with plastic drum liners, the tops were sealed and the moistened textured soybean chunks were tempered overnight. The tempering time was 14 hours. The moisture content of the textured soybean chunks after tempering was about 14 percent.

The tempered textured soybean chunks were fed to and flaked in a set of Lauhoff flaking rolls. Each Lauhoff flaking roll had a 24 inch diameter, was 30 inches long, had a smooth face and was coupled with a knife blade. The rolls were each internally cored for the admission of cooling water or steam. The feeding system for the rolls maintained a controlled, uniform flaking rate across the rolls. The moisture contact of the feed material, roll gap setting and the temperature of roll surfaces were the determining factors of flaking rate. Approximately 1,000 to 1,200 pounds of textured soybean chunks per hour was the flaking rate, with a flake density of 21 pounds per cubic foot being obtained at a 12/1000 inch gap of the roll setting and a feed material moisture of about 14 percent.

The textured soybean flakes were dried in a Wyssmont Turbo dryer (SR-16). The operating parameters and the drying conditions of the drying unit (SR-16) were as follows:

| Parameters | Operating Conditions |
| --- | --- |
| Air temperature, top | 215° F. |
| Air temperature, bottom | 200° F. |
| Air direction | Cross flow |
| Residence time (drying time) | 25 minutes |
| Turbo fan | 5 h.p. with 3:1 adjustable fan R.P.M. |
| Product depth on trays | The leveler height on the trays was adjusted according to the feed rate to prevent the product from by-passing. |

Under the above conditions, the product bulk density out of the dryer was 23 pounds per cubic foot with an average 6 to 7 percent of moisture content. The product temperature after drying was 150° to 165° F.

The flakes were sifted while being cooled to 90° F. using forced air as the cooling medium. The oversized flakes were sent for grinding to an Urschel Commitrol 1700 with 2-K-030300 knife (operating at 1320 r.p.m.) and recycled through the sifting and cooling apparatus. The flakes were bagged using a Fischbein bag closer with scale—each bag contained 25 pounds of flakes.

A very high percentage of the vitamins and minerals were retained in active form in the flakes. The resultant dry flakes were bland, light-colored, meat-like in texture and palatable. They did not contain any noticeable bitter beany flavor and taste. Further, there was no objectional odor when any storage package was opened, during rehydration or at any time thereafter. The flakes were very high in protein content. The rehydrated flakes had improved texture over known hydrated chunks and the like. The time to hydrate the flakes of this invention was very short.

EXAMPLE 3

A bag of the flakes from Example 2 was sieved to obtain a fraction which passed through a No. 6 U.S. Standard Sieve Screen. This fraction, termed "flakes-600" was admixed with the following ingredients in the following percentages to produce textured soy protein—fortified tuna salad:

| Ingredients | Percent By Weight |
| --- | --- |
| Chunk light tuna, drained | 37.06 |
| Chopped celery | 23.34 |
| Mayonnaise | 19.77 |
| Water | 8.24 |
| Flakes-600 | 4.12 |
| Chopped Onion | 3.84 |
| Lemon Juice | 2.47 |
| Salt | 1.00 |
| Black Pepper | 0.08 |
| Ground celery seed | 0.08 |
|  | 100.00 |

The flakes-600 readily admixed in with the other ingredients. The resultant textured soy protein-fortified tuna salad tasted like normal tuna salad, did not have beany soybean taste, and had a good consistency and a normal appearance.

EXAMPLE 4

A bag of the flakes from Example 2 was sieved to obtain a fraction which passed through a No. 12 U.S. Standard Sieve Screen and which did not pass through a No. 60 U.S. Standard Sieve Screen. This fraction, termed "flakes-1260," was admixed with the following ingredients in the following percentages to produce textured soy protein-fortified baked apple flavored instant hot breakfast wheat cereal.

| Ingredients | Percent By Weight |
|---|---|
| Wheat Middlings | 30.41 |
| Flakes-1260 | 30.41 |
| Fine Granular Sugar | 23.63 |
| Fortification Mix | 9.27 |
| Apple Flakes | 5.98 |
| Flavor | 0.3 |
| | 100.00 |

The flakes-1260 readily admixed in with the other ingredients. The resultant textured soy protein-fortified baked apply instant hot breakfast cereal tasted like normal baked apple instant hot breakfast cereal, did not have any beany soybean taste, and had a good consistency and a normal appearance.

EXAMPLE 5

A bag of the flakes from Example 2 was admixed with the following ingredients in the following percentages to produce textured soy protein-fortified onion flavored dehydrated bits:

| Ingredients | Percent By Weight |
|---|---|
| Flake | 83.33 |
| Water | 14.58 |
| Onion Flavor | 2.09 |
| | 100.00 |

The flakes readily admixed with the other ingredients. The resultant textured soy protein-fortified onion flavored dehydrated bits tasted like normal onion flavored dehydrated bits, did not have any beany soybean taste, and had a good consistency and a normal appearance.

EXAMPLE 6

A bag of the flakes from Example 2 was admixed with the following ingredients in the following percentages to produce textured soy protein-fortified ground beef (extended):

| Ingredients | Percent By Weight |
|---|---|
| Ground Beef | 74.8 |
| Flakes | 8.5 |
| Water | 16.5 |
| Spice Blend | 0.2 |
| | 100.00 |

The flakes readily admixed with the other ingredients. The resultant textured soy protein-fortified ground beef (extended) tasted like normal extended ground beef, did not have any beany soybean taste, and had a good consistency and a normal appearance. Various flavorings and seasonings were added to make various varieties of extended ground beef, e.g., Swedish meat balls.

EXAMPLE 7

A bag of the flakes from Example 2 was sieved to obtain a fraction which passed through a No. 6 U.S. Standard Sieve Screen. This fraction, termed "flakes-600," was admixed with the following ingredients in the following percentages to produce textured soy protein-fortified scrambled eggs:

| Ingredients | Percent By Weight |
|---|---|
| Whole Eggs | 77.0 |
| Flakes-600 | 7.7 |
| Water | 15.3 |
| | 100.00 |

The flakes-600 readily admixed in with the other ingredients. The resultant textured soy protein-fortified scrambled eggs tasted like normal scrambled eggs, did not have any beany soybean taste, and had a good consistency and a normal appearance.

EXAMPLE 8

A bag of the flakes from Example 2 was admixed with the following ingredients in the following percentages to produce textured soy protein-fortified bacon flavored chips:

| Ingredients | Percent By Weight |
|---|---|
| Flakes | 67.1 |
| Water | 16.8 |
| Flavoring and Coloring | 11.1 |
| Salt | 5.0 |
| | 100.00 |

The flavoring was hydrolyzed vegetable protein and the coloring was an artificial colorant. The flakes readily admixed with the other ingredients. The resultant textured soy protein-fortified bacon flavored chips tasted like normal bacon flavored chips, did not have any beany soybean taste, and had good consistency, a normal appearance and a flaked texture.

EXAMPLE 9

A bag of the flakes from Example 2 was sieved to obtain a fraction which passed through a No. 6 U.S. Standard Sieve Screen. This fraction, termed "flakes-600," was admixed with the following ingredients in the following percentages to produce textured soy protein-fortified cod fish cakes:

| Ingredients | Percent By Weight |
|---|---|
| Mashed Potatoes | 40.91 |
| Salt Cod (soaked overnight) | 27.27 |
| Whole Egg | 18.18 |
| Water | 9.09 |
| Flakes-600 | 4.55 |
| | 100.00 |

The flakes-600 readily admixed in with the other ingredients. The resultant textured soy protein-fortified cod fish cakes tasted like normal cod fish cakes, did not have any beany soybean taste and had a good consistency and a normal appearance.

EXAMPLE 10

A bag of the flakes from Example 2 was sieved to obtain a fraction which passed through a No. 6 U.S. Standard Sieve Screen. This fraction, termed "flakes-600," was admixed with the following ingredients in the following percentages to produce textured soy protein-fortified cold natural cereal:

| Ingredients | Percent By Weight |
|---|---|
| Quick rolled oats | 27.59 |
| Brown sugar | 20.69 |
| Flakes-600 | 13.79 |
| Unsweetened Coconut | 13.78 |
| Slivered Almonds | 6.90 |
| Non Fat Dried Milk | 3.45 |
| Peanut oil | 6.90 |
| Honey | 6.90 |
| | 100.00 |

The flakes-600 readily admixed in with the other ingredients. The resultant textured soy protein-fortified cold natural cereal tasted like normal cold natural cereal, did not have any beany soybean taste, and had good consistency, a normal appearance and a flaked texture.

EXAMPLES 11 TO 13

Example 1 was repeated three times, except that the soybean flake feed was replaced with soybean grits, soybean flour and soybean meal, respectively. The compacted materials were then processed as in Example 2.

EXAMPLE 14

Example 1 was repeated except that the soybean flake feed was not pretreated (tempered) in the preconditioning chamber. The soybean flake feed had a temperature of 95° C. when it was fed into the "Anderson expeller." The compacted material was then processed as in Example 2.

EXAMPLES 15 AND 16

Example 2 was repeated twice using soybean meal, having a moisture content of 5 and 8.5 percent, respectively, as the feed for the ∓Anderson expeller." The compacted material was then treated as in Example 2.

EXAMPLE 17

Example 1 was repeated, except that the conditions in the main horizontal pressing chamber were changed. The processing retention time (time during which the pressure is applied) in the chamber was 3 minutes, the pressure was 2500 p.s.i. and the thickness of the cake was about ¼ inch. The compacted material was then pressed as in Example 2.

EXAMPLE 18

Example 1 was repeated except that (1) the soybean flakes (feed) had a moisture content of 7.5 percent by weight (the feed had been pretreated in the preconditioning chamber to reduce the moisture content from 8.5 percent by weight and had a temperature of 85° C. when fed into the Anderson expeller), (2) a pressure of 5000 p.s.i. was used in the Anderson expeller, and (3) the retention or processing time in the pressure area of the Anderson expeller was 2 minutes. The compacted material was treated as in Example 2.

EXAMPLE 19

Example 1 was repeated except that the soybean flakes (feed) contained a nonsoluble coloring agent. The compacted material was treated as in Example 2.

The resultant dry flakes of Examples 11 to 19 were bland, light-colored, moist-like in texture and palatable, had improved texture, had a very short hydration time and did not contain any noticeable bitter, beany flavor or taste.

What is claimed is:

1. A dried, flakes, compacted, deoiled, laminated, textured soy protein material which instantly hydrates; does not expand or become spongelike upon hydration; is palatable and edible upon hydration; has a protein content of 30 percent or more; has an improved bland flavor, lacking the bitter beany flavor and taste normally associated with soy; physically blends in well with fish or poultry because of its similar layered or flaked texture, as opposed to granular textured vegetable protein which does not blend in well; does not require flavor masking agents because of its bland flavor; readily accepts the flavor of the food system in which it is used; is light-colored, and, upon hydration, maintains its structural integrity, has cohesiveness, and does not disintegrate into a pasty consistency as do other soy products.

2. A simulated fish formulation for human consumption which includes the flaked material of claim 1.

3. A simulated poultry formulation for human consumption which includes the flaked material of claim 1.

* * * * *